United States Patent Office 3,275,700
Patented Sept. 27, 1966

3,275,700
PREPARATION OF ALKYLADAMANTANES HAVING AN ETHYL SUBSTITUENT
Edward J. Janoski, Havertown, Pa., and Robert E. Moore, Wilmington, Del., assignors to Sun Oil Company, Philadelphia, Pa.
No Drawing. Filed Apr. 13, 1964, Ser. No. 359,401
18 Claims. (Cl. 260—666)

This application is a continuation-in-part of our co-pending application Serial No. 314,259, filed October 7, 1963.

This invention relates to the catalytic isomerization of $C_{12}$-$C_{15}$ tricyclic perhydroaromatic hydrocarbons and more particularly concerns the conversion thereof to alkyladamantanes having an ethyl substituent. More specifically the alkyladamantanes produced according to the invention are ethyladamantane ($C_{12}$), methylethyladamantane, ($C_{13}$), dimethylethyladamantane ($C_{14}$) and trimethylethyladamantane ($C_{15}$). The catalyst employed is a combination of hydrogen fluoride and boron trifluoride.

The carbon nucleus of adamantane contains ten carbon atoms arranged in a completely symmetrical, strainless manner such that there are four condensed, six-membered rings and four bridgehead carbon atoms. The structure of adamantane ($C_{10}H_{16}$) is commonly depicted typographically as follows:

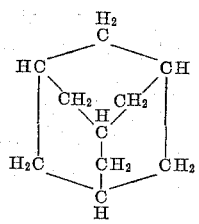

This hydrocarbon has a melting point of 268° C., sublimes beneath its melting point and hence does not occur in liquid form. Due to the symmetrical, strainless arrangement of the carbon atoms and the fact that dehydrogenation cannot occur because of the bridgehead carbon atoms, adamantane is a highly stable hydrocarbon. While numerous derivatives of this hydrocarbon are known, it does not appear that ethyl-substituted adamantanes have been prepared heretofore other than by classical synthesis. The present invention provides a method of preparing ethyl-substituted adamantanes of the $C_{12}$-$C_{15}$ range by isomerization of tricyclic perhydroaromatic hydrocarbons.

The charge material for the present process is any tricyclic perhydroaromatic hydrocarbon of the $C_{12}$-$C_{15}$ range. The rings can be condensed or uncondensed, and all of them need not be six-membered rings. For example, the starting hydrocarbon can be perhydroacenaphthene which has twelve carbon atoms and the following structure:

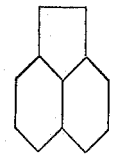

in which one of the rings is five-membered and hence not itself perhydroaromatic. The other two rings correspond to naphthalene after complete hydrogenation and accordingly constitute a perhydroaromatic system. An example of an uncondensed perhydroaromatic of the class specified is cyclobutylcyclopentylcyclohexane which has fifteen carbon atoms and three uncondensed rings.

As a general rule perhydroaromatics of the class used in practicing the present invention are not readily available. However, the corresponding aromatic hydrocarbons can be derived from sources such as straight run or cracked petroleum fractions and coal tar. Hence, such aromatic hydrocarbons can serve as suitable starting material and can be readily converted into perhydroaromatics for use in the present process by complete hydrogenation utilizing a suitable catalyst. One suitable catalyst for this purpose is Raney nickel. Appropriate hydrogenation conditions when using this catalyst include a temperature of 200-275° C., a hydrogen pressure of 2000-4000 p.s.i.g., a catalyst to hydrocarbon weight ratio of 1:4 to 1:20 and a reaction time of 2-12 hours. Other suitable catalysts that can be used include platinum, cobalt molybdate, nickel tungstate, or nickel sulfide-tungsten sulfide, with these hydrogenating components being deposited on alumina. Platinum reforming catalysts available commercially can be used for this purpose. These and other catalysts generally are used at the same pressure but at higher temperatures than Raney nickel, such as 300-400° C., in order to effect complete hydrogenation of the aromatic hydrocarbon.

Table I gives examples of aromatic hydrocarbons that can be hydrogenated to produce perhydroaromatics for use in the present process.

Table I

| Aromatic | Number of Carbon Atoms | Structural Formula |
|---|---|---|
| Acenaphthene | 12 | |
| 2,3-cyclopentano-indane. | 12 | |
| Hydrindacene | 12 | |
| 6,7-cyclopentano-indane. | 12 | |
| Fluorene | 13 | |
| 1,2-cyclopentanonaphthalene. | 13 | |
| 2,3-cyclopentanonaphthalene. | 13 | |

Table I—Continued

| Aromatic | Number of Carbon Atoms | Structural Formula |
|---|---|---|
| Phenalene (Perinaphthene). | 13 | 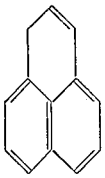 |
| Homotetraphthene | 13 | 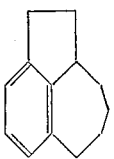 |
| Anthracene | 14 | 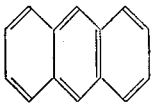 |
| Phenanthrene | 14 | 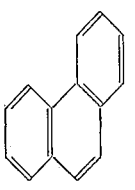 |
| Indane-1-spiro cyclohexane. | 14 | 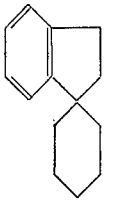 |
| Tetralin-2-spiro cyclopentane. | $C_{14}$ | 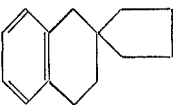 |
| 1,2-; 3,4-dibenzo-cycloheptatriene. | $C_{15}$ | 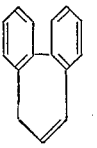 |
| 1-cyclobutyl-4-cyclopentylbenzene. | $C_{15}$ | 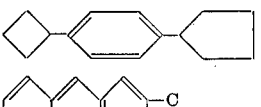 |
| 2-methylanthracene | $C_{15}$ | 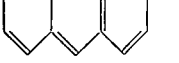 |

The compounds shown in Table I are merely exemplary of the types of aromatics that can be converted by hydrogenation into perhydroaromatics which are useful in practicing the present invention. Numerous other aromatics having three rings and from twelve to fifteen carbon atoms can also be used. These include aromatics having non-cyclic substituents such as methyl and ethyl groups as well as olefinic or acetylenic groups. In other words any tricyclic aromatic of the $C_{12}$–$C_{15}$ range or any mixture thereof after complete hydrogenation can be used as feed stock for the present process.

According to the invention $C_{12}$–$C_{15}$ alkyladamantanes having one ethyl substituent are prepared by contacting tricyclic perhydroaromatics of the $C_{12}$–$C_{15}$ range at 50–200° C. with an HF–BF$_3$ catalyst, continuing such contact until at least a substantial proportion of the perhydroaromatic has been converted to hydrocarbon having adamantane structure but stopping such contact before the resulting alkyladamantane has mainly isomerized to polymethyladamantane, i.e., to adamantanes having only methyl substituents. It is highly important for obtaining the desired ethyl-substituted products to stop the reaction at the right stage as otherwise the main products will be dimethyladamantane, trimethyladamantane, tetramethyladamantane or pentamethyladamantane with the methyl groups being substituted mainly at bridgehead positions on the adamantane nucleus. When the reaction is stopped at the appropriate stage, generally more than 40% of the reaction product will be adamantanes with a single ethyl substituent and from 0 to 3 methyl substituents depending upon the number of carbon atoms in the starting perhydroaromatic. Substitution of the adamantane nucleus occurs largely at the bridgehead positions although a minor amount of methyl or ethyl groups will be attached at non-bridgehead postions. Thus the following compounds can be obtained as main products of the isomerization reaction:

From $C_{12}$ perhydroaromatics --- 1-ethyladamantane.
From $C_{13}$ perhydroaromatics --- 1-methyl - 3 - ethyladamantane.
From $C_{14}$ perhydroaromatics --- 1,3 - dimethyl-5-ethyladamantane.
From $C_{15}$ perhydroaromatics --- 1,3,5 - trimethyl - 7-ethyladamantane.

This isomerization reaction is effected merely by contacting the perhydroaromatic hydrocarbon charge with the HF–BF$_3$ catalyst at a temperature in the range of 50–200°, more preferably 70–150° C. and still more preferably 75–125° C. A saturated hydrocarbon diluent for the perhydroaromatic can be employed if desired although this generally is not necessary. When a diluent is used, it preferably is an alkyl naphthene such as methylcyclohexane or dimethylcyclohexane. The weight ratio of perhydroaromatic to HF employed can vary widely, ranging for example from 100:1 to 1:10. However ratios in the range of 2–20:1 are preferred. Likewise the molar ratio of HF to BF$_3$ can vary widely, ranging say from 1:100 to 100:1, but HF:BF$_3$ molar ratios in the range of 1:1 to 50:1 are preferred. The effective catalyst apparently is a complex formed between the HF and BF$_3$. Pressures in the reaction zone can vary widely depending largely upon the temperature employed and the amount of BF$_3$ used. Typically the pressure is in the range of 200–800 p.s.i.g.

The reaction time for the isomerization reaction will vary widely depending upon the temperature used and also upon the proportion of HF–BF$_3$ catalyst complex relative to the amount of perhydroaromatic charged. Hence the reaction time may vary from 5 minutes to 100 hours. However, at reaction temperatures in the preferred range of 75–125° C., reaction times of 3–24 hours are more typical.

The mechanism of the reaction catalyzed by HF–BF$_3$ involves a series of isomerizations in which the final products would be polymethyladamantanes if the reaction were allowed to proceed too long a time. The ethyl-substituted adamantanes represent an intermediate stage in the overall isomerization and hence it is important that the reaction be stopped at this stage. When the starting material is a $C_{12}$ perhydroaromatic other than perhydroacenaphthene, the first stage of isomerization produces perhydroacenaphthene which has the structure shown hereinbefore. Further isomerization then converts this compound to ethyladamantane. It appears that the first ethyladamantane formed is the 2-isomer, i.e., with the ethyl group attached to a non-bridgehead carbon atom. However, this 2-isomer evidently is rapidly isomerized to 1-ethyladamantane, so that as a practical matter the 1- isomer always seems to predominate over the 2-isomer in the reaction product. Additional isomerization will cause conversion of the ethyladamantane to dimethyladamantane which initially appears to be a mixture of the two non-bridgehead isomers, namely, 1,2- and 1,4-dimethyladamantane. If the reaction is continued, these compounds will isomerize to the bridgehead isomer, 1,3-dimethyladamantane, which is the isomer favored thermodynamically and thus is the final product if the isomerization is allowed to run its full course. In practicing the present invention, the reaction is stopped short of complete isomerization so that the production of ethyladamantane, largely 1-ethyladamantane, can be maximzed. The ethyladamantane can be recovered from the other reaction products by distillation under good fractionating conditions.

In the case of $C_{13}$–$C_{15}$ tricyclic perhydroaromatic starting material the first type of structure formed upon isomerization is that of perhydroperinaphthene (otherwise known as perhydrobenzonaphthene and perhydrophenalene). Thus the nucleus at this first stage will have the following structure:

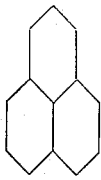

When the starting perhydroaromatic has thirteen carbon atoms, the first isomerization product is perhydroperinaphthene itself. Analogously the first reaction product from a $C_{14}$ charge is methylperhydroperinaphthene while that from a $C_{15}$ charge is dimethylperhydroperinaphthene. Further isomerization gives an adamantane nucleus to which is attached an ethyl group and one, two or three methyl groups depending upon the number of carbon atoms in the starting material. The ethyl group appears to be attached initially to a non-bridgehead carbon atom but is rapidly isomerized to a bridgehead position. The one methyl group for a $C_{13}$ hydrocarbon charge and the two methyl groups in case of $C_{14}$ tend to preferentially appear at bridgehead position. Thus for $C_{13}$ material 1-methyl-3-ethyladamantane is produced, while for a $C_{14}$ charge 1,3-dimethyl-5-ethyladamantane forms. In the case of $C_{15}$ perhydroaromatics one ethyl and three methyl groups are formed and again the preferred substituent positions are at the four bridgehead carbons. In all of these isomerizations the reaction should be stopped at the proper stage to maximize the yield of the ethyl-substituted product, as otherwise the ethyl group will be converted to two methyl groups thus producing polymethyladamantanes. In the case of $C_{15}$ material reaction for too long a time not only converts the dimethylethyladamantane to 1,2,3,5,7-pentamethyladamantane but also tends to result in cracking.

The ethyl-substituted adamantanes prepared according to the present invention have high thermal stabilities and unusually wide liquid ranges for saturated hydrocarbons. They accordingly have utility as special coolants and lubricants. By way of comparison, 1-ethyladamantane has melting and boiling points of about −60° C. and 219° C., respectively, while the corresponding values for its isomer, 1,3-dimethyladamantane, are about −30° C. and 205° C. Again, the melting and boiling points for 1,3-dimethyl-5-ethyladamantane are, respectively, below −80° C. and 235° C., while the corresponding values for its isomer, 1,3,5,7-tetramethyladamantane, are about 67° C. and 215° C.

The following examples illustrate the invention more specifically.

EXAMPLE I

Acenaphthene is dissolved in methylcyclohexane and then hydrogenated at 475° F. and under a hydrogen pressure of 500 p.s.i.g. using a 1% platinum-on-alumina catalyst to form perhydroacenaphthene ($C_{12}H_{20}$). After removal of most of the methylcyclohexane by distillation, the perhydroacenaphthene containing 3.3% of residual methylcyclohexane is charged in amount of 520 g. to an autoclave provided with means for effecting agitation. 70 g. of anhydrous HF are added and 30 g. of $BF_3$ are pressured into the autoclave. When the reaction mixture is warmed to 31° C. and agitated at that temperature for about 3 hours, substantially no reaction occurs. The mixture is then heated to and maintained in the range of 65–85° C. and mainly in the neighborhood of 82° C. for 6.3 hours while being agitated. The reaction is then stopped, and the hydrocarbon layer is separated from the catalyst layer and washed to remove residual catalyst. The hydrocarbon product is analyzed by separating the components by means of vapor phase chromatography and determining what most of the components are by nuclear magnetic resonance, infrared and mass spectroscopy and carbon and hydrogen analysis. Results are shown in Table II.

Table II

|  | Charge, percent | Product, percent |
|---|---|---|
| Methylcyclohexane | 3.3 |  |
| Isodecalins |  | 0.6 |
| 1,3-dimethyladamantane |  | 20.1 |
| 1,2- and 1,4-dimethyladamantane [1] |  | 12.3 |
| Unidentified $C_{12}$ adamantane |  | 3.2 |
| 1-ethyladamantane |  | 48.9 |
| 2-ethyladamantane |  | 14.9 |
| Perhydroacenaphthene | 96.7 |  |
|  | 100.0 | 100.0 |

[1] The two isomers occur in approximately equal amounts.

The data in Table II show that ethyladamantanes constitute the main product and that the bridgehead isomer (1-ethyladamantane) is the main ethyl-substituted isomer.

EXAMPLE II

Perhydrophenanthrene is prepared by hydrogenating phenanthrene by substantially the same procedure as used in the preceding example. Two runs are made in which the hydrogenated product in admixture with a small amount of methylcyclohexane is isomerized. One run is carried out mainly at about 90° C. for 3 hours and the other mainly at about 100° C. for 8 hours. Upon working up and analyzing the products as in the preceding example, the following results are obtained:

| Reaction temperature | 90° C. | 100° C. |
|---|---|---|
| Reaction time, hours | 3 | 8 |
| Hydrocarbon charge: |  |  |
| Perhydrophenanthrene, g | 527 | 311 |
| Methylcyclopentane, g | 13 | 13 |
| Catalyst: |  |  |
| HF, g | 32 | 100 |
| $BF_3$, g | 35 | 35 |
| Liquid product: |  |  |
| Methylcyclohexane | 1.9 | 4.0 |
| $C_8$ naphthene | None | Trace |
| $C_9$ naphthene | None | 1.7 |
| $C_{10}$ naphthene | None | 0.6 |
| Methyladamantane | Trace | 1.7 |
| 1,3,5,7-tetramethyladamantane | 0.5 | 5.6 |
| Other tetramethyladamantanes | 3.8 | 2.3 |
| 1,3-dimethyl-5-ethyladamantane | 11.4 | 59.3 |
| Unidentified adamantanes | 11.0 | 10.1 |
| Methylperhydroperinaphthene | 50.5 | 9.0 |
| Perhydroanthracene | 17.6 | 4.0 |
| Perhydrophenanthrene | 3.3 | 1.7 |

The tabulated data show that for the run conducted at 90° C. a reaction time of 3 hours is not sufficient to isomerize the $C_{14}$ perhydroaromatic to the stage at which dimethylethyladamantane is the main product. This run represents the earlier stage of isomerization at which the main product has the perhydroperinaphthene structure. The other run made at the somewhat higher temperature and longer time represents the isomerization stage at which the dimethylethyladamantane is approximately maximized, as shown by the 59.3% product content of 1,3-dimethyl-5-ethyladamantane.

The foregoing examples illustrate the preparation of ethyl-substituted adamantanes having twelve and fourteen carbon atoms, respectively. In like manner ethyl-substituted adamantanes having thirteen and fifteen carbon atoms can be prepared from any $C_{13}$ and any $C_{15}$ tricyclic perhydroaromatic, respectively. Each of these ethyl-substituted products can be separated from the isomers with which they are associated by superfractionation and thereby recovered in high purity.

We claim:

1. Method of preparing alkyladamantanes of the $C_{12}$–$C_{15}$ range which has an ethyl substituent on the adamantane nucleus which comprises contacting a perhydroaromatic hydrocarbon having three rings and from 12 to 15 carbon atoms at a temperature in the range of 50–200° C. with an $HF$–$BF_3$ catalyst, continuing such contact until at least a substantial proportion of the perhydroaromatic has been converted to hydrocarbon product having adamantane structure, whereby alkyladamantane having an ethyl substituent is formed, and stopping such contact before said alkyladamantane has mainly isomerized to polymethyladamantane.

2. Method according to claim 1 wherein the temperature is in the range of 70–150° C.

3. Method according to claim 1 wherein said perhydroaromatic contains twelve carbon atoms and said alkyladamantane is ethyladamantane.

4. Method according to claim 3 wherein the temperature is in the range of 70–150° C.

5. Method according to claim 1 wherein said perhydroaromatic contains thirteen carbon atoms and said alkyladamantane is methylethyladamantane.

6. Method according to claim 5 wherein the temperature is in the range of 70–150° C.

7. Method according to claim 1 wherein said perhydroaromatic contains fourteen carbon atoms and said alkyladamantane is dimethylethyladamantane.

8. Method according to claim 7 wherein the temperature is in the range of 70–150° C.

9. Method according to claim 1 wherein said perhydroaromatic contains fifteen carbon atoms and said alkyladamantane is trimethylethyladamantane.

10. Method according to claim 9 wherein the temperature is in the range of 70–150° C.

11. Method which comprises contacting a tricyclic $C_{12}$ perhydroaromatic hydrocarbon at 75–125° C. with an $HF$–$BF_3$ catalyst, continuing such contact until at least a substantial proportion of the perhydroaromatic has been converted to ethyladamantane comprising mainly 1-ethyladamantane, and stopping such contact before the ethyladamantane has mainly isomerized to dimethyladamantane.

12. Method according to claim 11 wherein the weight ratio of perhydroaromatic to HF used is in the range of 2–20:1 and the molar ratio of HF to $BF_3$ is in the ratio of 1:1 to 50:1.

13. Method which comprises contacting a tricyclic $C_{13}$ perhydroaromatic hydrocarbon at 75–125° C. with an $HF$–$BF_3$ catalyst, continuing such contact until at least a substantial proportion of the perhydroaromatic has been converted to methylethyladamantane comprising mainly 1-methyl-3-ethyladamantane, and stopping such contact before the methylethyladamantane has mainly isomerized to trimethyladamantane.

14. Method according to claim 13 wherein the weight ratio of perhydroaromatic to HF used is in the range of 2–20:1 and the molar ratio of HF to $BF_3$ is in the ratio of 1:1 to 50:1.

15. Method which comprises contacting a tricyclic $C_{14}$ perhydroaromatic hydrocarbon at 75–125° C. with an $HF$–$BF_3$ catalyst, continuing such contact until at least a substantial proportion of the perhydroaromatic has been converted to dimethylethyladamantane comprising mainly 1,3-dimethyl-5-ethyladamantane, and stopping the reaction before the dimethylethyladamantane has mainly isomerized to tetramethyladamantane.

16. Method according to claim 15 wherein the weight ratio of perhydroaromatic to HF used is in the range of 2–20:1 and the molar ratio of HF to $BF_3$ is in the ratio of 1:1 to 50:1.

17. Method which comprises contacting a tricyclic $C_{15}$ perhydroaromatic hydrocarbon at 75–125° C. with an $HF$–$BF_3$ catalyst, continuing such contact until at least a substantial proportion of the perhydroaromatic has been converted to trimethylethyladamantane comprising mainly 1,3,5-trimethyl-7-ethyladamantane, and stopping the reaction before the trimethylethyladamantane has mainly disappeared from the reaction product.

18. Method according to claim 17 wherein the weight ratio of perhydroaromatic to HF used is in the range of 2–20:1 and the molar ratio of HF to $BF_3$ is in the ratio of 1:1 to 50:1.

References Cited by the Examiner

UNITED STATES PATENTS

| | | | |
|---|---|---|---|
| 2,937,211 | 5/1960 | Ludwig | 260—666 |
| 3,128,316 | 4/1964 | Schneider | 260—666 |

OTHER REFERENCES

Raymond C. Fort, Jr., et al.: Chem. Rev., vol 64, No. 3, pp. 277–300, June 1964.

DELBERT E. GANTZ, *Primary Examiner.*

V. O'KEEFE, *Assistant Examiner.*